United States Patent

Hinton et al.

Patent Number: 6,103,413
Date of Patent: Aug. 15, 2000

[54] BIPOLAR PLATES FOR ELECTROCHEMICAL CELLS

[75] Inventors: Carlos E. Hinton; Carey L. Scortichini; Robert D. Mussell, all of Midland, Mich.

[73] Assignee: The Dow Chemical Company, Midland, Mich.

[21] Appl. No.: 09/082,931

[22] Filed: May 21, 1998

[51] Int. Cl.$^7$ .............................. H01M 6/48; H01M 8/24
[52] U.S. Cl. .............................. 429/32; 429/33; 429/210; 428/411.1
[58] Field of Search ................................ 429/33, 210, 32; 428/411.1

[56] References Cited

U.S. PATENT DOCUMENTS

| | | | |
|---|---|---|---|
| 4,505,992 | 3/1985 | Dettling et al. | 429/36 |
| 4,900,643 | 2/1990 | Eskra et al. | 429/210 X |
| 5,556,627 | 9/1996 | Lafollette | 429/210 |
| 5,620,807 | 4/1997 | Mussell et al. | 429/33 |
| 5,702,755 | 12/1997 | Mussell | 429/33 X |
| 5,798,188 | 8/1998 | Mukohyada et al. | 429/210 X |
| 5,800,946 | 1/1998 | Grosvenor et al. | 429/210 |

FOREIGN PATENT DOCUMENTS

| | | |
|---|---|---|
| 0 784 352 | 7/1997 | European Pat. Off. . |
| 91/03057 | 3/1991 | WIPO . |
| 97/13287 | 4/1997 | WIPO . |
| 98 33221 | 7/1998 | WIPO . |

OTHER PUBLICATIONS

Patent Abstracts of Japan, vol. 012, No. 069, JP 62211868 A, 62211868, Pub. Date Sep. 17, 1987, "*Gas Seperating Plate for Fuel Cell*".

"Active Layer for Membrane Electrode Assembly", filed in the United States of America on Mar. 7, 1997, Application Serial No. 08/813,773; Applicants: Robert D. Mussell et al.

"Electrode Ink for Membrane Electrode Assembly", filed in the United States of America on Jul. 31, 1997, Application Serial No. 08/904,258; Applicant: Robert D. Mussell.

"Macroporous Flow Field Assembly", filed in the United States of America on May 23, 1997, Application Serial No. 08/862,273 Applicants: Robert D. Mussell et al.

*Primary Examiner*—Stephen Kalafut

[57] ABSTRACT

A bipolar separator plate for two electrochemical cells connected in series, the plate having two layers of a porous electronically conductive material having positioned therebetween a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$Darcy ($\mu$D).

19 Claims, 4 Drawing Sheets

CARBON PAPER IMPREGNATED WITH PLASTICS AND CARBON REINFORCEMENT

CARBON REINFORCED PLASTICS

COOLING CHANNELS

CARBON PAPER LAYER

CARBON REINFORCED THERMOPLASTIC PLATE

TUBING

LOCATING PLATE (ONE ON EACH SIDE)

CARBON REINFORCED THERMOPLASTIC PLATE

CARBON PAPER LAYER

CHASE (MOLD)

BIPOLAR PLATES FOR ELECTROCHEMICAL CELLS

BACKGROUND OF THE INVENTION

This invention relates to electrochemical cells, and more particularly to components of such cells that have low permeability and are electronically conductive.

Electrochemical cells typically contain separator plates which are relatively impermeable to gases or liquid contained in the cell. Such plates are usually part of a gas or liquid distribution assembly. In fuel cells, for example, the separator plate is typically a graphite plate which has gas distribution channels machined into one of its surfaces. However, such plates are expensive to produce. U.S. Pat. No. 4,505,992 discloses a laminate for use as part of a fuel cell assembly which comprises having a layer of a sealant material sandwiched between two porous carbon plates. However, the permeability and resistivity characteristics of such a composite may be less than desirable for certain applications.

SUMMARY OF THE INVENTION

Figure 1:
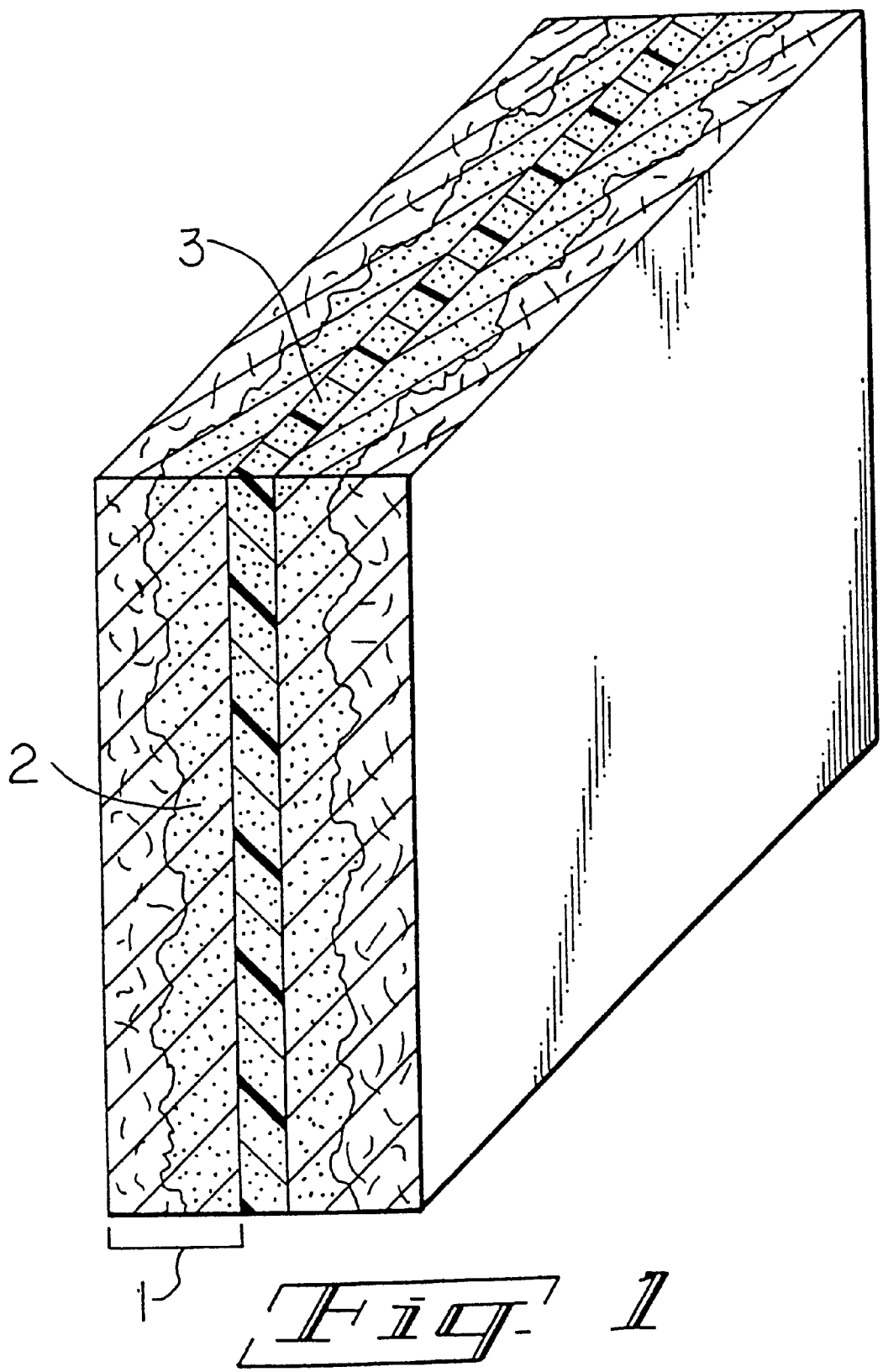
FIG. 1 illustrates a bipolar plate.

In one aspect, this invention is a bipolar separator plate for two electrochemical cells connected in series, the plate comprising two layers of a porous electronically-conductive material having positioned therebetween a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$Darcy ($\mu$D).

In another aspect, this invention is an electrochemical device having at least two electrochemical cells connected in series, each cell containing a gas or liquid material which is separated from a different gas or liquid material in an adjacent cell by two porous layers of electronically-conductive material having positioned therebetween a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$D.

It has been discovered that the bipolar plate of the invention has desirable permeability, resistivity, and structural integrity characteristics for use in an electrochemical cell, particularly for cells in which the reactants on either side of the plate are pressurized. These and other advantages of the invention will be apparent from the description which follows.

DETAILED DESCRIPTION

Examples of suitable porous electronically-conductive materials include carbon paper, graphite paper, carbon felts, or other carbon-based composites, porous metal materials such as sintered metals, metal meshes, and metal screens, and solid, porous, electronically conductive polymers having a thickness of at least 1 mil. The optimum thickness for the material will depend on the application, as well as the desired permeability and conductivity. Preferably, the material has a porosity of at least 20 percent, more preferably at least 40, most preferably at least 60 percent; but is preferably no greater than 90 percent, more preferably no greater than 85 percent, most preferably no greater than 80 percent.

Suitable polymeric materials which contain the conductive filler include any thermoplastic or thermosetting polymer which is a solid at ambient conditions (about 23° C.), stable under the operating conditions of the electrochemical cell, and can be mixed with a conductive filler and processed into the shape of a separator plate for use with electrochemical cells. Examples of such include polyolefins, polystyrenes, polyepoxides, polyurethanes (including Isoplast™ and Pellethane™ polyurethane resins, available from The Dow Chemical Company), polytetrafluoroethylenes, polyacrylates, polyethylene terephthalate, polyvinylchloride, polyvinylidene fluoride, vinyl ester resins (available from The Dow Chemical Company as Derakane™ resins), acrylonitrile-butadiene-styrene copolymers, polyamides, polyesters, linear polyimides, liquid crystal polymers, as well as blends and copolymers thereof. Preferably, the polymer is polypropylene, syndiotactic polystyrene, Isoplast™ polyurethane resin, polyvinylidene fluoride, a vinyl ester resin, or polytetrafluoroethylene.

Suitable conductive fillers include electronically-conductive grades of carbon black, carbon fibers, graphite, metal fibers and particles, and particles of intrinsically-conductive polymers. Suitable carbon fibers include those having a length of about 0.25 inch and a diameter of about 7 $\mu$m, as well as agglomerates of fibers having an aspect ratio of at least 5 and a diameter in the range of 3.5 to 70 nm as described, for example, in WO 91/03057. Suitable graphite particles have a size in the range of 20 to 500 nm and a surface area in the range of 1 to 100 m$^2$/g. Examples of suitable carbon blacks include particles of carbon having an average primary particle diameter of less than 125 nm, more preferably of less than 60 nm. The carbon black is preferably utilized as an aggregate or agglomerate of primary particles, the aggregate or agglomerate typically having a size of 5 to 10 times the primary particle size. Larger agglomerates, beads, or pellets of carbon particles may also be utilized as a starting material in the preparation of the composition, so long as they disperse during the preparation or processing of the composition sufficiently to reach an average size in the cured composition of less than 10 microns, more preferably less than 5 microns, and most preferably less than 1.25 microns. Preferably, the conductive filler is a carbon fiber having an aspect ratio of at least 5, more preferably at least 50, most preferably at least 100. However, the optimum aspect ratio of the fiber will depend on the mean pore size of the porous electronically-conductive material, with longer fibers being more suitable for use with larger mean pore size materials.

The conductive filler is preferably employed in an amount, based on the weight of the polymeric material, of at least 1 percent, more preferably at least 10 percent, most preferably at least 20 percent; but preferably no greater than 90 percent, more preferably no greater than 70 percent.

The bipolar plate may be made by any suitable process, but is preferably prepared by injection or compression molding a mixture of a thermoplastic polymer and a conductive carbon into the desired shape and size, and then combining the porous conductive layers with the molded layer by compression molding a multilayer composite of the molded layer positioned between two layers of the porous conductive material. Alternatively, sheets of a filled thermoplastic material may be compression molded between layers of the porous conductive material. In a third embodiment, a filled thermoplastic material may be injected between two layers of the porous conductive material in a mold, and then the resulting composite is compression molded.

The pressure and temperature of the process should be high enough to ensure good electrical contact between the conductive layer and the porous layers, and to increase the density of the solid layer and/or the electronically-conductive material, if necessary to achieve the desired permeability characteristics and/or better conductivity. Preferably, the pressure and temperature is sufficient to cause a portion of the solid conductive layer to migrate into the pores of the porous layer in order to achieve better electrical contact between the layers. As the polymer portion of the layer migrates into the porous material, the conductive carbon tends to stay between the two porous layers and the concentration of conductive carbon in the middle layer increases accordingly, thereby increasing the conductivity of that layer. Although the degree of compaction of the composite may vary depending on the materials (such as, for example, the carbon paper thickness and porosity) and the performance requirements for use in a particular type of electrochemical cell, the composite is preferably compressed under conditions sufficient to reduce its volume by 5 to 80 percent. FIG. 1 shows a bipolar plate prepared by a compression molding process, having two layers of porous carbon paper (1) and a layer of a polymer containing a conductive filler (3). During the molding process, a portion of the polymer migrated into the porous carbon paper (2).

If a thermosetting polymer is used, the bipolar plate may be prepared by injecting the reactive monomeric components of a multi-part reactive thermosetting mixture (containing conductive filler) between two layers of the porous conductive material in a mold. Alternatively, a latent-curable thermosetting polymer may be used in processes similar to those employed with thermoplastic polymers. The bipolar plate containing the uncured polymer may then be subjected to reaction conditions which cause the polymer to crosslink or cure.

The optimum thickness of the bipolar plate will depend on the types of electrochemical cell in which it is employed. For fuel cells, the thickness is preferably at least about 2 mils, more preferably at least 5 mils, most preferably at least 10 mils; but is preferably no greater than 200 mils, more preferably no greater than 100 mils, most preferably no greater than 75 mils.

Permeability

The permeability of the solid layer is less than 50 microdarcys ($\mu D$). Preferably, the permeability is less than 20 $\mu D$ and is more preferably less than 10 $\mu D$. The permeability of the layer may be measured according to the following method: The solid material to be tested is mounted in a simple pressure cell equipped with rubber gaskets that prevent gas flow around the sample as well as to the outside of the cell. Pressurized air at 30 psig is supplied to one face of the sample while the air flow rate at atmospheric pressure is measured using a soap bubble or other flow rate measuring device. The permeability of the solid material is calculated from the pressure and flow data using the Darcy equation for a compressible fluid:

$$K = 2\mu L Q_a P_a / A (P_b^2 - P_a^2)$$

where K is the permeability in $cm^2$ (K can also be expressed in Darcys; 1 Darcy=$0.99 \times 10^{-8}$ $cm^2$), $\mu$ is the viscosity of the fluid at the measurement temperature in pascal seconds, L is the length of the flow path in cm (the thickness of the solid material in this case), $Q_a$ is the flow rate at the outlet in $cm^3/s$, $P_a$ is the pressure at the outlet in pascals, A is the area in $cm^2$, and $P_b$ is the pressure at the inlet in pascals.

If the electrochemical cell is a fuel cell, the bipolar plate preferably has a "leak rate" of no greater than 3 cm/min, more preferably no greater than 1 cm/min, and most preferably no greater than 0.3 cm/min. The procedure for measuring the leak rate is as follows: mount the sample in a pressure cell and apply 30 psig air to one side of the sample and measure the air flow rate (at 0 psig) out the other side. The leak rate is the flow rate (in $cm^3/min$) divided by the area (in $cm^2$) of the bipolar plate.

Resistivity

The area resistivity of the bipolar plate is preferably less than 0.1 $\Omega$-$cm^2$, more preferably less than 0.01 $\Omega$-$cm^2$, and most preferably less than 0.003 $\Omega$-$cm^2$. The area resistivity may be measured and calculated as follows: Resistance is measured by clamping a 4 $cm^2$ bipolar plate between two (4 $cm^2$) brass plates which serve as direct current (250 mA) carrying electrodes. The voltage across the thickness of the sample is measured via screws mounted in and electrically isolated from each brass plate. The resistance is then calculated by diving the measured voltage by the current. The Area Resistivity=Rs, where R=resistance ($\Omega$) and s=area of bipolar plate being measured (i.e., area of brass plate) ($cm^2$).

Cooling Channels

Figure 2:
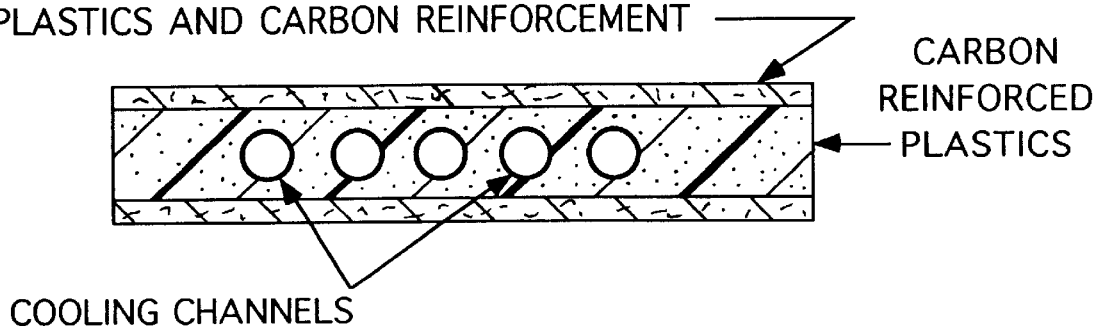
FIG. 2 illustrates a bipolar plate having built-in cooling channels.

In another embodiment of the invention, cooling channels may be built into the bipolar plate, which are useful if the electrochemical cell generates heat and optimum performance is achieved if the device temperature is kept low. For example, during its regular operation an individual fuel cell or stack will generate heat. Built in cooling channels in the bipolar plates will help manage this heat by convection or by circulating cooling fluid through this channels (see FIG. 2 for illustration).

For fuel cell stacks of less than 1 kilowatt, it is expected that air driven by a fan through straight cooling channels would be sufficient. For higher wattage stacks, the cooling channels may need to contain a different heat-exchange fluid. Cooling channels may be fabricated using a small diameter (such as 1/16 inch) polytetrafluoroethylene tubing or small gauge (such as 18 gauge) stainless steel tubing. Further, the addition of cooling channels may require the fabrication of thicker bipolar plates. After the fabrication of the bipolar plate with cooling channels, the tubing may be extracted from the bipolar plate, leaving built-in length-wise through channels in the plate, or may be left in place.

Figure 3:
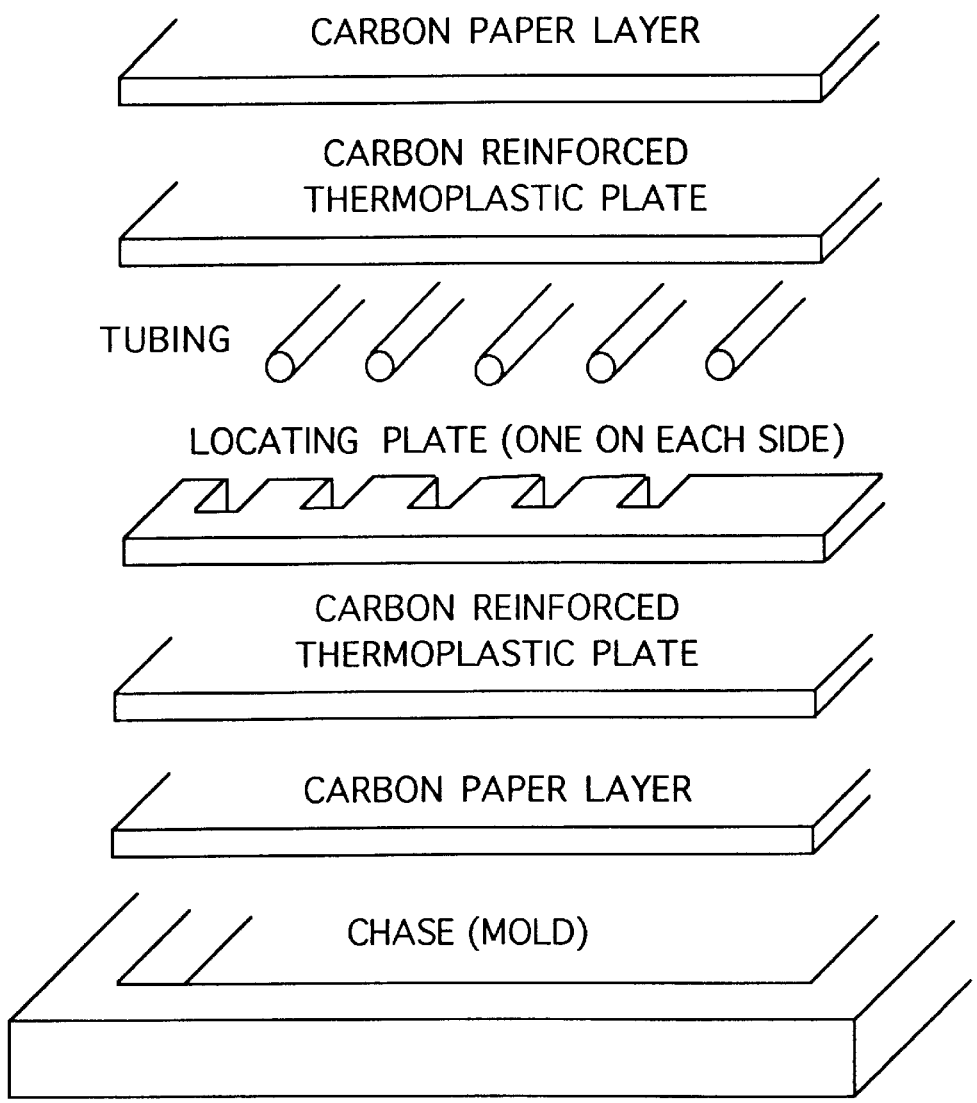
FIG. 3 illustrates an assembly of components of a bipolar plate with cooling channels, prior to molding the assembly.

A preferred fabrication process is as follows: (1) Two carbon-filled thermoplastic plates are prepared; (2) A number of conduits are cut to lengths greater than the width of the desired bipolar plate; (3) Two carbon paper pieces are cut to fit the width and length of the mold chase; (4) Inside the chase, arrange the different components in the following order (as illustrated in FIG. 3): Carbon paper layer, Carbon-reinforced thermoplastic plate, Conduits at regular parallel intervals covering the desired cooling area (To keep conduits in place, location plates which do not extend into the interior of the assembly and do not become a part of it may be needed), Carbon-reinforced thermoplastic plate, Carbon paper layer; (5) Using a regular fabrication cycle, mold the arrangement prepared in step (4); and (6) Retrieve bipolar plate with cooling channels.

Bipolar Plates with Cooling Flow Fields

In another embodiment, an additional layer of porous electronically-conductive material may be positioned between two outer layers of porous electronically-conductive material. A solid layer of polymeric material is positioned between the center porous layer and each outer layer. The center layer is thicker and selected so that it does not compress as easily as the outer layers of porous material during the fabrication process. The thicknesses of the center layers and the solid layers of polymeric material are selected so that the center layer does not become completely filled with polymeric material during the molding process. This type of bipolar plate configuration leaves an open porous area in the middle of the bipolar plate, through which a cooling fluid may be circulated.

ILLUSTRATIVE EMBODIMENTS

The following examples illustrate the invention, but are not intended to limit it in any way. Unless otherwise stated, all parts and percentages are given by weight.

EXAMPLE 1

Three membrane and electrode assemblies ("MEAs") are prepared according to the method described in PCT publication No. WO 97/13287. The Pt catalyst loadings of the three cathode and three anode sides are 0.21, 0.19 and 0.18; and 0.14, 0.13, and 0.17 mg/cm$^2$, respectively. The active (catalyzed) area of each of the three cells is 19.8 cm$^2$. The MEAs are soaked in dilute sulfuric acid, then water, and loaded into the stack wet.

Porous cathode flow fields are constructed according to the method described in PCT publication No. WO 97/13287. Porous carbon paper having a porosity of 90 percent and 24 mils thick (available as Spectracarb™ paper from Spectracorp (Lawrence, Mass.)) is made hydrophilic by oxidation in a medium comprising 0.006 M silver sulfate, 0.2 M sodium persulfate and 0.5 M sulfuric acid at a temperature of 60° C. for 1 hour. The porous anode flow fields are density 0.42 g/cm$^3$, 14-mil thick porous carbon paper, also from Spectracorp. The edges of the flow fields are sealed with epoxy to provide a gas tight seal both internally and to the exterior of the stack.

Air and hydrogen delivery layers are constructed from 3 layers of 10-mil thick Grafoil™ graphite paper by cutting out channels with a scalpel. When the stack is assembled, these layers cooperate with the bipolar plates and MEAs to form ducts that deliver reactant gases to the porous flow fields. These ducts are joined to internal manifolds that are formed from holes in the various elements when the stack is assembled.

End plates are constructed of ½-inch thick aluminum. Next to each end plate is placed a 73-mil thick layer of 316 alloy stainless steel to prevent corrosion of the inside face of the end plate.

Bipolar plates are constructed according to the present invention for use in the stack. Carbon fiber-filled nylon 66 (50 percent carbon fiber loading by weight, density 1.38 g/cm$^3$, obtained from DSM Engineering Plastics) is first dried at 80° F. for 16 hours in vacuum (29 mm Hg), then compression molded using a programmable compression molding machine. The desired amount of carbon fiber-filled nylon 66 (calculated as the thickness times the length times the width of the chase, or mold, times the density of the carbon fiber-filled nylon 66) is placed in the chase, or mold, which is sandwiched between two Kapton™ slip sheets. This assembly is then further sandwiched between two thick smooth-finish metal sheets and placed in the compression-molding machine. After a 4-minute heat-soak stage wherein the mold platens of the compression mold are pre-heated to 540° F., closed, and compressed to a pressure of slightly above 0 psi, the pressure in the mold is increased to 500 lbf for 4 minutes, and then increased to 10,000 lbf for 3 minutes, while maintaining the mold temperature at 540° F.

Spectracarb™ paper having a density of 0.50 g/cm$^3$ and a thickness of 11.5 mils is placed on both sides of the carbon fiber-filled nylon 66 molded layer. This arrangement is placed in a 16-mil thick chase (mold) and returned to the compression-molding machine. Molding cycles identical to those described above are applied, giving a final fabricated product 16 mils thick. This product is tested for electrical resistivity and gas permeability before use as a bipolar plate material in the stack.

The stack is assembled from the cathode end plate up, using ⅛-inch diameter nylon 66 rods as guides to align the stack elements. These guides are left in place in the assembled stack. The order of stacking elements is as follows: aluminum anode end plate; stainless steel layer, hydrogen delivery layer, anode flow field; MEA 1; cathode flow field; air delivery layer; bipolar plate; hydrogen delivery layer; anode flow field; MEA 2; cathode flow field; air delivery layer; bipolar plate; hydrogen delivery layer; anode flow field; MEA 3; cathode flow field; air delivery layer; stainless steel layer; and aluminum cathode end plate.

Once assembly is complete, the bolts are evenly tightened to 50 inch-pounds torque. The bolts are to be re-tightened over a period of hours to obtain uniform compression. Further tightening is required as the stack is heated to the operating temperature of 80° C. The operational thickness of this stack under full compression (minus the end plates and stainless steel layers) is about 299 mils.

The stack is evaluated using a fuel cell test stand manufactured by Fuel Cell Technologies, Inc. (Los Alamos, N.Mex.). The test stand incorporates a 120 ampere Hewlett-Packard 60504B Electronic Load module with a 600 watt rating, as well as hardware to provide flow control of gas streams, heating and humidity for both cathode and anode gases, and back-pressure control for operation at pressures above atmospheric pressure. During operation, the stack self-heats to above the desired operating temperature of 80° C., but adequate cooling is provided by an external fan.

The stack is operated under the following conditions: cathode gas: air at 30 psig outlet pressure, 1970 standard cubic centimeters per minute (sccm) flow rate, and humidified at 88° C.; and anode gas: hydrogen at 20 psig outlet pressure, 830 sccm flow rate, and humidified at 100° C. After a 24-hour break-in period, the stack delivers 1.70 volts at 19.8 A (1 A/cm$^2$), or about 34 watts.

Figure 4:
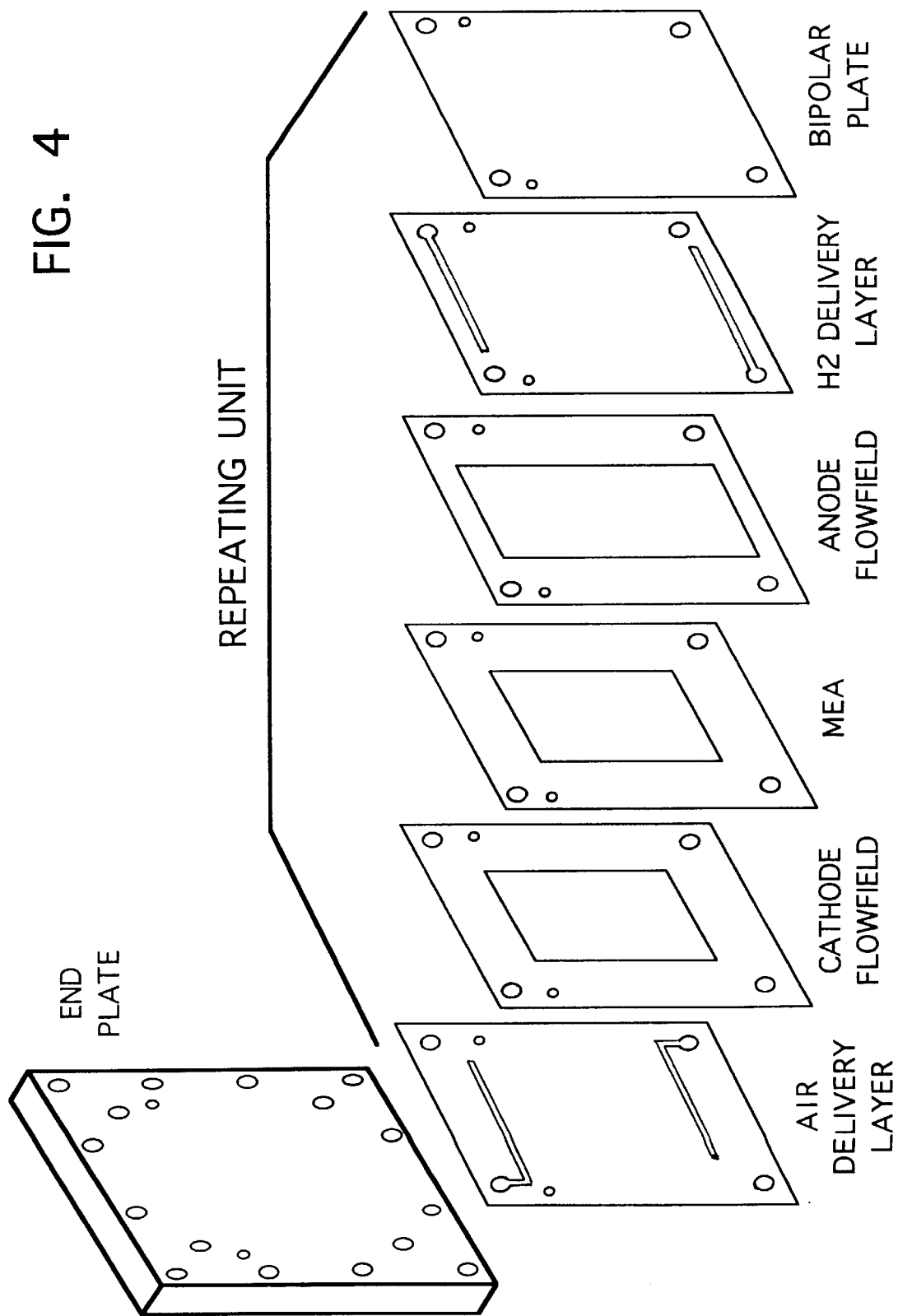
FIG. 4 is an exploded schematic diagram of stack based on porous flow fields and containing the bipolar plate material of the present invention.

FIG. 4 is an exploded schematic diagram of stack based on porous flow fields and containing the bipolar plate material of the present invention. From left to right, the elements are: end plate, air delivery layer, cathode flow field, MEA, anode flow field, hydrogen delivery layer, and bipolar plate.

Figure 5:
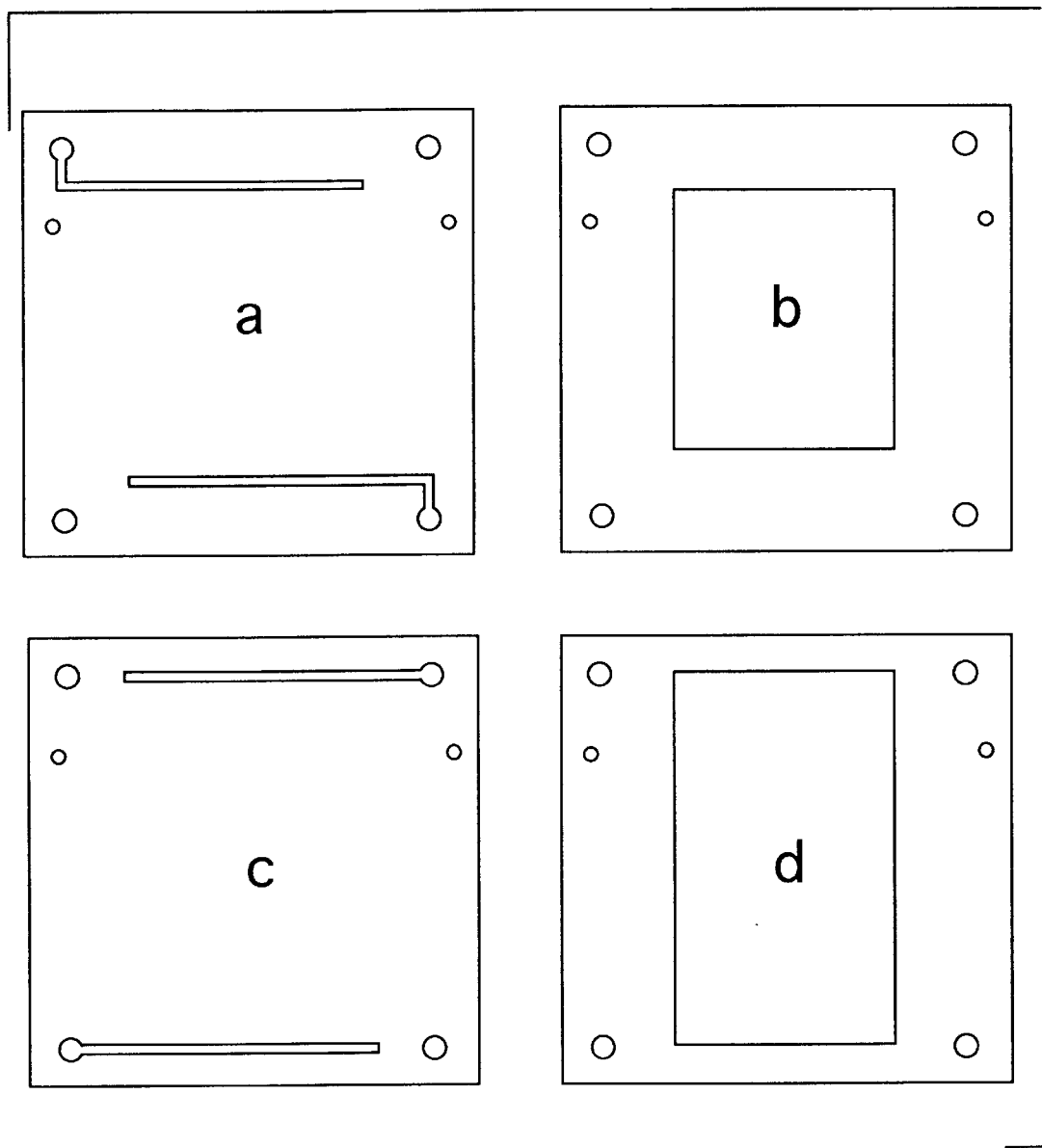
FIG. 5 shows selected components of a fuel cell stack, including the (a) air delivery layer; (b) air flow field; (c) hydrogen delivery layer; and (d) hydrogen flow field.

FIG. 5 shows selected stack components, as follows: (a) air delivery layer; (b) air flow field; (c) hydrogen delivery layer; and (d) hydrogen flow field.

EXAMPLES 2–7

Carbon-containing solid layers are prepared using the method described in Example 1, using the following materials and molding parameters:

TABLE 1

Carbon-filled Thermoplastics

| Carbon filler | Load (% wt.) | Plastic | Form, density (g/cm³) | Company, material code | Drying Vacuum Conditions | Melting Temp. (° F.) |
|---|---|---|---|---|---|---|
| Black | 40 | poly-propylene | pellets, 0.97–1.01 | RTP Co., ESD-C-100 | no | 450 |
| Fiber | 40 | poly-carbonate | pellets, 1.36 | RTP Co., RTP-387 | 110° C., 16 hrs., 29 mm Hg Vac | 610 |
| Fiber | 50 | nylon 66 | pellets, 1.38 | DSM Eng. Plastics, J-1/CF/50/EG | 80° F., 16 hrs., 29 mm Hg Vac | 540 |

TABLE 2

Materials and Molding Conditions

| Molding Stages | | PP & Carbon Black | PC & Carbon Fiber | Nylon 66 & Carbon Fiber |
|---|---|---|---|---|
| Temperature (° F.) | | 450 | 610 | 540 |
| Stage 1 | Heat Soak (minutes) | 3 | 3 | 4 |
| Stage 2 | Time (minutes) | 5 | 10 | 4 |
| | Low-Pressure (lbf) | 500 | 500 | 500 |
| Stage 3 | Time (minutes) | 3 | 3 | 3 |
| | High-Pressure (lbf) | 10000 | 10000 | 10000 |
| Time to cool mold to ambient temperature using a heat-transfer fluid (minutes) | | 20 | 20 | 20 |

Notes: The chase (mold) is 8-mils thick, 5.75 in. long, and 5.75 in. wide.
PP = polypropylene; PC = polycarbonate.

Bipolar plates are then prepared using the above-described solid layers and the following carbon papers. The carbon papers are obtained from Spectracorp (Lawrence, Mass.) and Toray (Tokyo, Japan). In Comparative Examples 1 and 2, the carbon paper/plastic assemblies are compressed sufficiently to cause the fibers of the paper to touch each other within the bipolar plate, in order to achieve electrical contact between the layers and good conductivity.

TABLE 3

Bipolar Plate Compositions

| Example No. | Carbon paper, density (g/cm³), thickness (mil) | Fill | Plastic | Plate Thickness (mil) |
|---|---|---|---|---|
| Comp. Ex. 1* | Spectracorp, 0.50, 11.5 | none | nylon 66 | 21.5 |
| 2 | Toray (TGPH090), 0.50, 9 | carbon fiber | nylon 66 | 23 |
| 3** | Spectracorp, 0.50, 11.5 | carbon fiber | nylon 66 | 16 |
| 4 | Spectracorp, 0.50, 11.5 | carbon black | poly-propylene | 20 |
| 5 | Spectracorp, 0.25, 8 | carbon fiber | nylon 66 | 12 |
| Comp. Ex. 2* | Spectracorp, 0.50, 11.5 | none | poly-propylene | 19.5 |
| 6 | Spectracorp, 0.69, 18.5 | carbon fiber | nylon 66 | 44.5 |
| 7 | Spectracorp, 0.67, 11.5 | carbon fiber | nylon 66 | 32.5 |

*Comparative Example - not an example of the invention.

Below are the values for the product of through-plane resistivity for Examples 2–7.

TABLE 4

| Example No. | Area Resistivity ($\Omega\text{-cm}^2$) | Permeability ($\mu D$) |
|---|---|---|
| Comp. Ex. 1* | 0.0202 | too high to measure |
| 2 | 0.00018 | 0.14 |
| 3 | 0.0018 | 0.20 |
| 4 | 0.0042 | 2.5 |
| 5 | 0.00024 | 3.7 |
| Comp. Ex. 2* | 0.00074 | 15 |
| 6 | 0.0068 | 2.1 |
| 7 | 0.014 | 1.2 |

EXAMPLES 8–10

Three bipolar plates with cooling channels are assembled as illustrated in FIG. 3, using polytetrafluoroethylene or steel tubing as a conduit material, except that carbon paper is used in Example 8. The chase (mold) thickness (See FIG. 3) is double the plate thickness. The carbon paper used is 11.5 mils thick and has a density of 0.50 g/cm³. The assemblies are molded under the conditions described in Examples 1–7.

TABLE 5

Dimensions of Components for the Bipolar Plate with Cooling Channels

| Example No. | Material | Conduit Diameter | Plate Thickness (mil) |
|---|---|---|---|
| 8 | carbon black & polypropylene | 1/16 in. polytetrafluoroethylene | 63 |
| 9 | carbon fiber & nylon 66 | 1/16 in. polytetrafluoroethylene | 63 |
| 10 | carbon fiber & nylon 66 | 18 gauge stainless steel | 42 |

Upon molding, the polytetrafluoroethylene tubing does not collapse when placed in between the carbon black-polypropylene plates and is easily retrieved. The cooling holes that run inside the plate are centered. The carbon-black polypropylene has a relatively low viscosity at its processing temperatures, and the molten material easily conforms around the polytetrafluoroethylene tubing. However, due to the much greater viscosity of the carbon fiber-filled nylon 66 at its recommended processing temperature, the polytetrafluoroethylene tubing collapses when trying to mold a plate out of this material.

When the stainless steel conduit, gauge 18, is employed to mold cooling channels in a carbon-fiber nylon 66 bipolar plate, the tubing does not collapse. The metal tubing is not retrieved.

What is claimed is:

1. A bipolar separator plate for two electrochemical cells connected in series, the plate comprising two layers of a porous electronically-conductive material having positioned therebetween a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$Darcy ($\mu$D).

2. The separator plate of claim 1 wherein the conductive filler is used in an amount, based on the weight of the polymeric material, of at least 20 percent.

3. The separator plate of claim 1 wherein the conductive filler is used in an amount, based on the weight of the polymeric material, of at least 50 percent.

4. The separator plate of claim 1 wherein the conductive filler is carbon fiber having a diameter of about 7 $\mu$m.

5. The separator plate of claim 1 which has a thickness of at least about 10 mils.

6. The separator plate of claim 1 wherein the porous electronically-conductive material is carbon fiber paper having a porosity of at least 60 percent.

7. The separator plate of claim 1 wherein the polymeric material is a thermoplastic polyurethane.

8. The separator plate of claim 1 wherein the polymeric material is a polypropylene.

9. The separator plate of claim 1 wherein the polymeric material is a syndiotactic polystyrene.

10. The separator plate of claim 1 wherein the polymeric material is a vinyl ester resin.

11. The separator plate of claim 1 wherein the polymeric material is polyvinylidene fluoride.

12. The separator plate of claim 1 wherein the polymeric material is polytetrafluoroethylene.

13. The separator plate of claim 1 wherein the polymeric material is a polyepoxide.

14. A bipolar separator plate for two electrochemical cells connected in series, the plate comprising three layers of a porous electronically-conductive material having positioned between the first and second layer, and the second and third layer, a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$Darcy ($\mu$D).

15. An electrochemical device having at least two electrochemical cells connected in series, each cell containing a gas or liquid material which is separated from a different gas or liquid material in an adjacent cell by two porous layers of electronically-conductive material having positioned therebetween a solid layer of a polymeric material having dispersed therein at least 1 percent by weight of a conductive filler, wherein the plate has an area resistivity of less than 1 ohm-cm$^2$, and wherein the solid layer has a permeability of less than 50 $\mu$D.

16. The electrochemical device of claim 15 wherein the conductive filler is used in an amount, based on the weight of the polymeric material, of at least 50 percent.

17. The electrochemical device of claim 15 wherein the conductive filler is carbon fiber having a diameter of about 7 $\mu$m.

18. The electrochemical device of claim 15 which has a thickness of at least about 20 mils.

19. The electrochemical device of claim 15 wherein the porous electronically-conductive material is a carbon fiber paper having a porosity of at least 70 percent.

* * * * *